United States Patent [19]
Kuo

[11] Patent Number: 6,113,205
[45] Date of Patent: Sep. 5, 2000

[54] SELF-ASSEMBLED CLOSET

[75] Inventor: Chun-Ta Kuo, Tainan, Taiwan

[73] Assignee: Universal Tannery Co., Ltd., Tainan Hsien, Taiwan

[21] Appl. No.: 09/290,233

[22] Filed: Apr. 13, 1999

[51] Int. Cl.[7] .................................................. A47B 88/00
[52] U.S. Cl. ...................... 312/334.7; 312/350; 108/143
[58] Field of Search ................ 312/334.14, 334.16, 312/334.28, 334.29, 334.36, 334.7, 350, 245, 246; 108/143, 102; 403/339, 340

[56] References Cited

U.S. PATENT DOCUMENTS

| | | | |
|---|---|---|---|
| 3,241,850 | 3/1966 | Propst | 312/246 X |
| 4,138,176 | 2/1979 | Cowdroy | 312/334.16 X |
| 4,180,298 | 12/1979 | Borgerson, Jr. | 312/246 X |
| 5,366,284 | 11/1994 | Baker et al. | 312/334.7 X |
| 5,688,069 | 11/1997 | Hoshino | 403/340 |
| 5,827,006 | 10/1998 | Hoshino | 403/340 |

*Primary Examiner*—Janet M. Wilkens
*Assistant Examiner*—Michael J. Fisher

[57] ABSTRACT

A self-assembled closet utilizes clip elements to secure deck boards to side boards. The clip element comprises a female strip and a male strip. Each male strip and each female strip has a protuberance, through apertures, and arcuate engaging recess at the top portion and an extending protuberance which allows the male strip and the female strip to clamp each other.

2 Claims, 7 Drawing Sheets

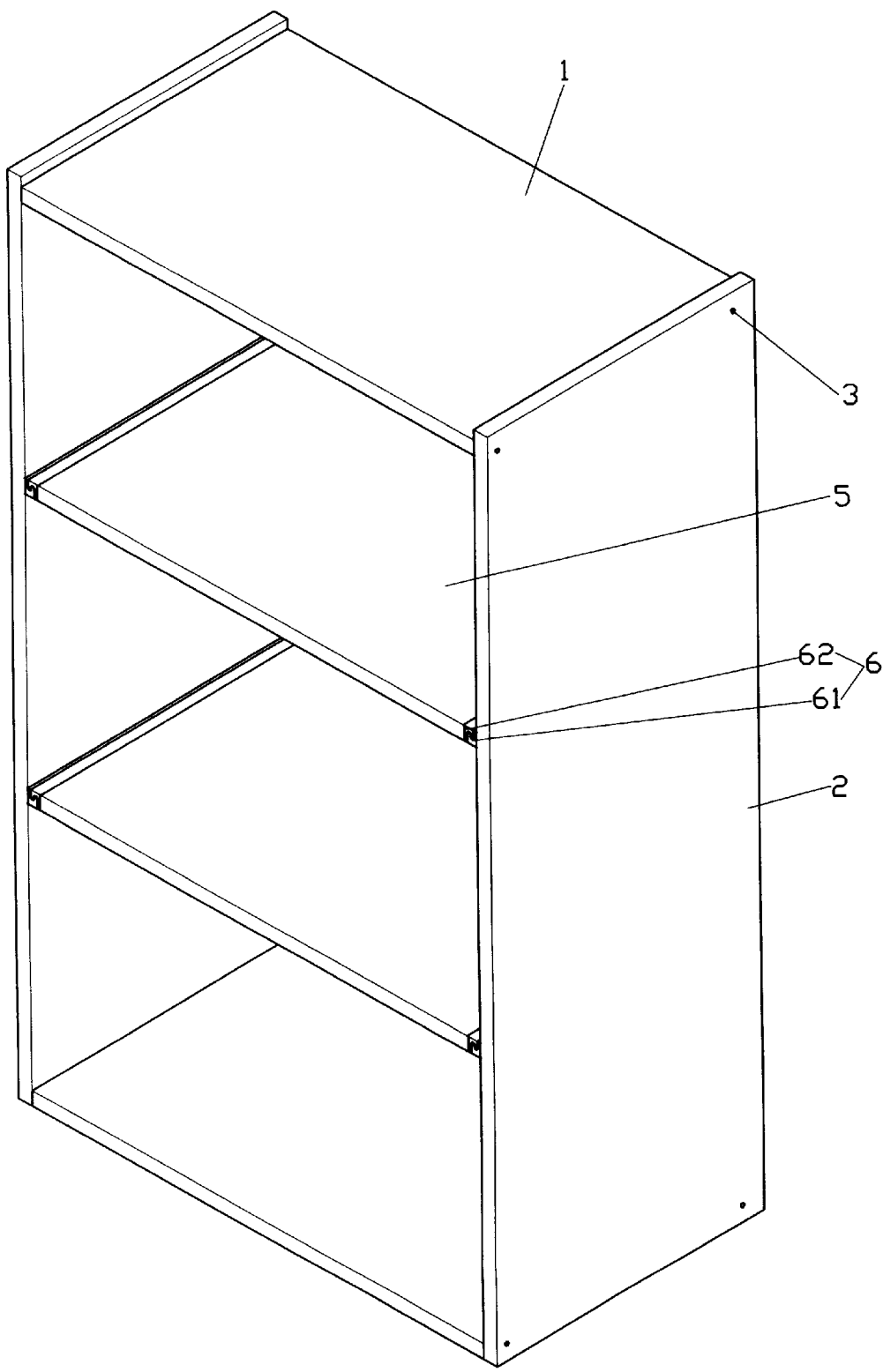
F I G . 2

SELF-ASSEMBLED CLOSET

BACKGROUND OF THE INVENTION

1. Field of the Invention

This invention relates to a self-assembled closet, and more particularly to a closet having clip elements on the sides of each deck board and the side boards for easy engagement.

2. Prior Art

The conventional closets are typically available in fixed sizes which are not adjustable. Therefore, in many cases, a family has to either buy a smaller size closet or custom made, which is costly. Thus, a self-assembled closet was devised. That device possesses some shortcomings, for instance, when people readjust the size or reassemble the closet, the holes from the original fasteners will leave an ugly appearance, further, the holes may even be enlarged and no longer fit snugly with the fasteners.

SUMMARY OF THE INVENTION

The primary object of the present invention is to provide a self-assembled closet which is easy to assemble and disassemble.

It is another object of the invention to provide a self-assembled closet which is adjustable in size.

It is a further object of the present invention to provide a self-assembled closet which is inexpensive to produce.

BRIEF DESCRIPTION OF THE DRAWINGS

FIG. 2 is a perspective view of a closet incorporating the present invention;

DETAILED DESCRIPTION OF THE PREFERRED EMBODIMENTS

Figure 1:
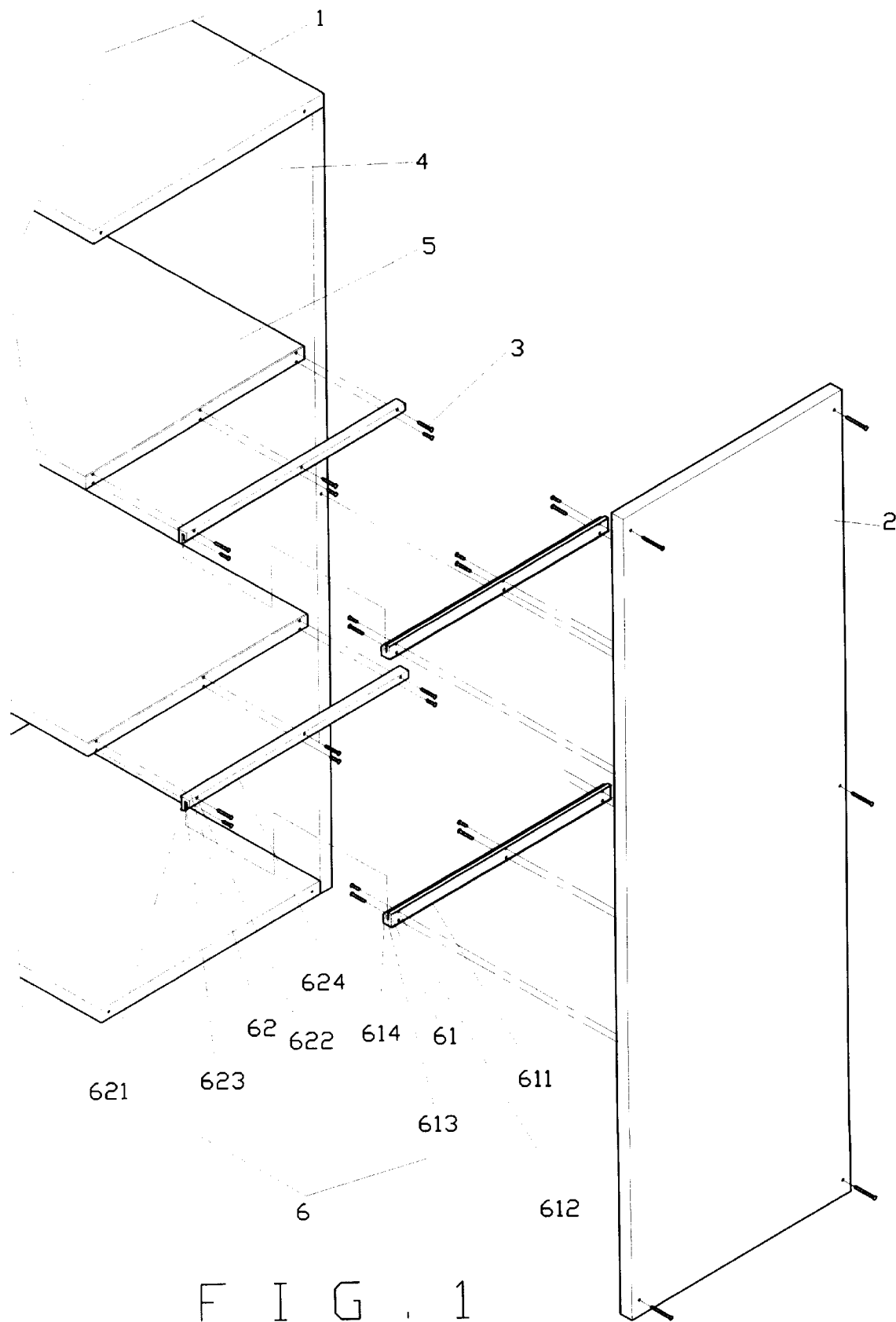
FIG. 1 is an exploded view of the present invention.

With reference to the FIGS. 1 and 2, the present invention is a closet that is basically composed of a pair of top boards 1 and a pair of side boards 2 secured by fasteners 3 to form a closet frame, and a back board 4 at one side of the closet. The closet is composed of several deck boards 5.

The inner sides of the two side boards 2 and the two ends of each deck board 5 are secured with clip elements 6. Each clip element 6 comprises a male strip 61 and a female strip 62 that engage tightly with each other. Each male strip 61 and each female strip 62 has an extending engaging portion 611, 621 and plural apertures 612, 622. Engaging recesses 613, 623 are formed longitudinally along the strips 61, 62, the strips having extending protuberances 613, 624 extending therefrom.

Figure 3:
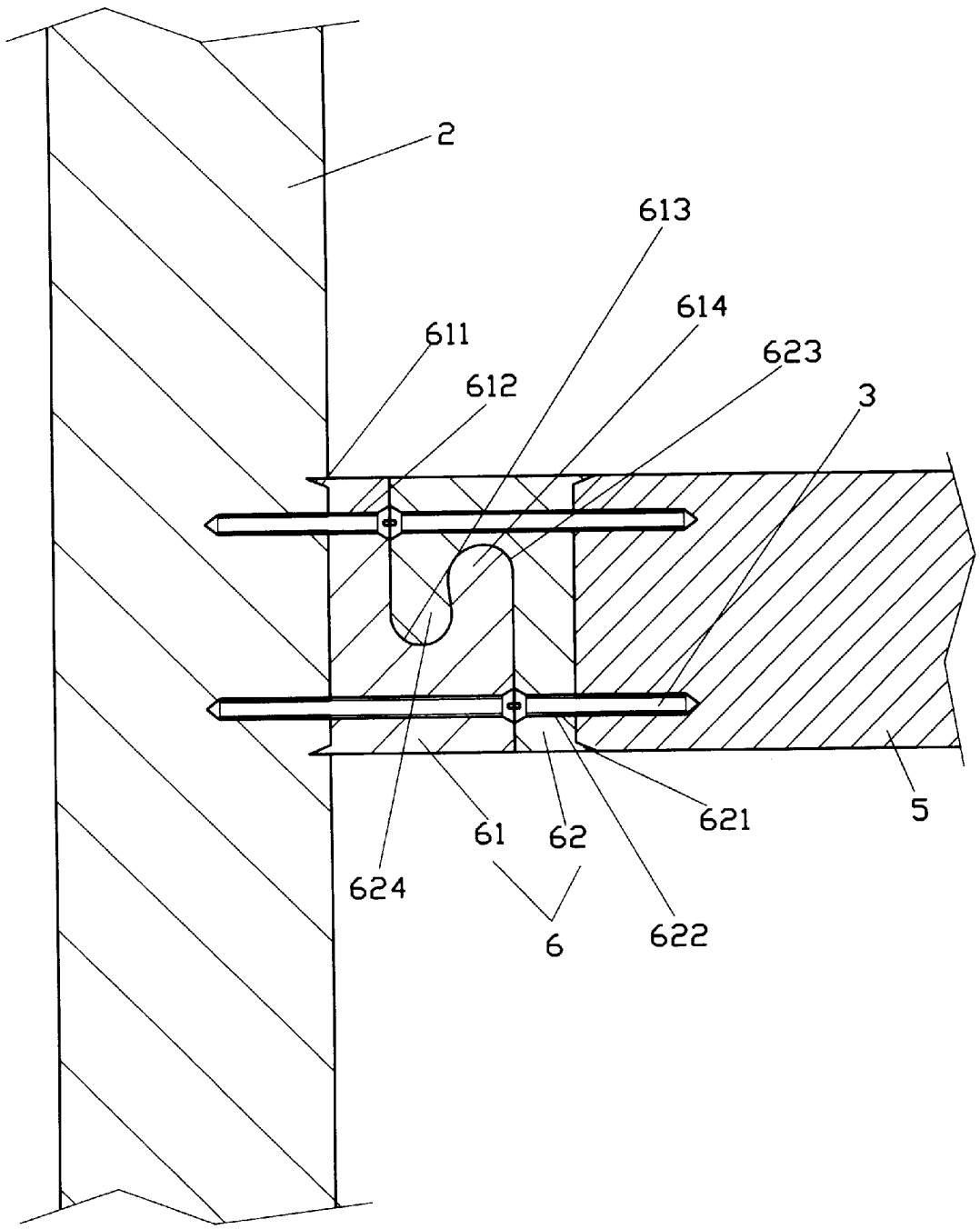
FIG. 3 is a cross-sectional view of FIG. 2 showing a clip element of the present invention.

In operation, as shown in FIGS. 2 and 3, the engaging portion 611 of the male strips 61 are secured onto the side boards 2 by fasteners 3 through the holes 612. Then, the engaging portion 621 of the female strips 62 are secured onto the side edges of each deck board 5 by fasteners 3 through holes 623. The deck boards 5 are slid into the frame with the protuberances 614 and 624 slid into the engaging recesses 613 and 623, respectively, to form secured position.

To disassemble the deck boards 5, the deck boards 5 are slid away from the closet frame, the protuberances 614 and 624 are slid along the engaging recesses 612 and 622, respectively.

Figure 4:
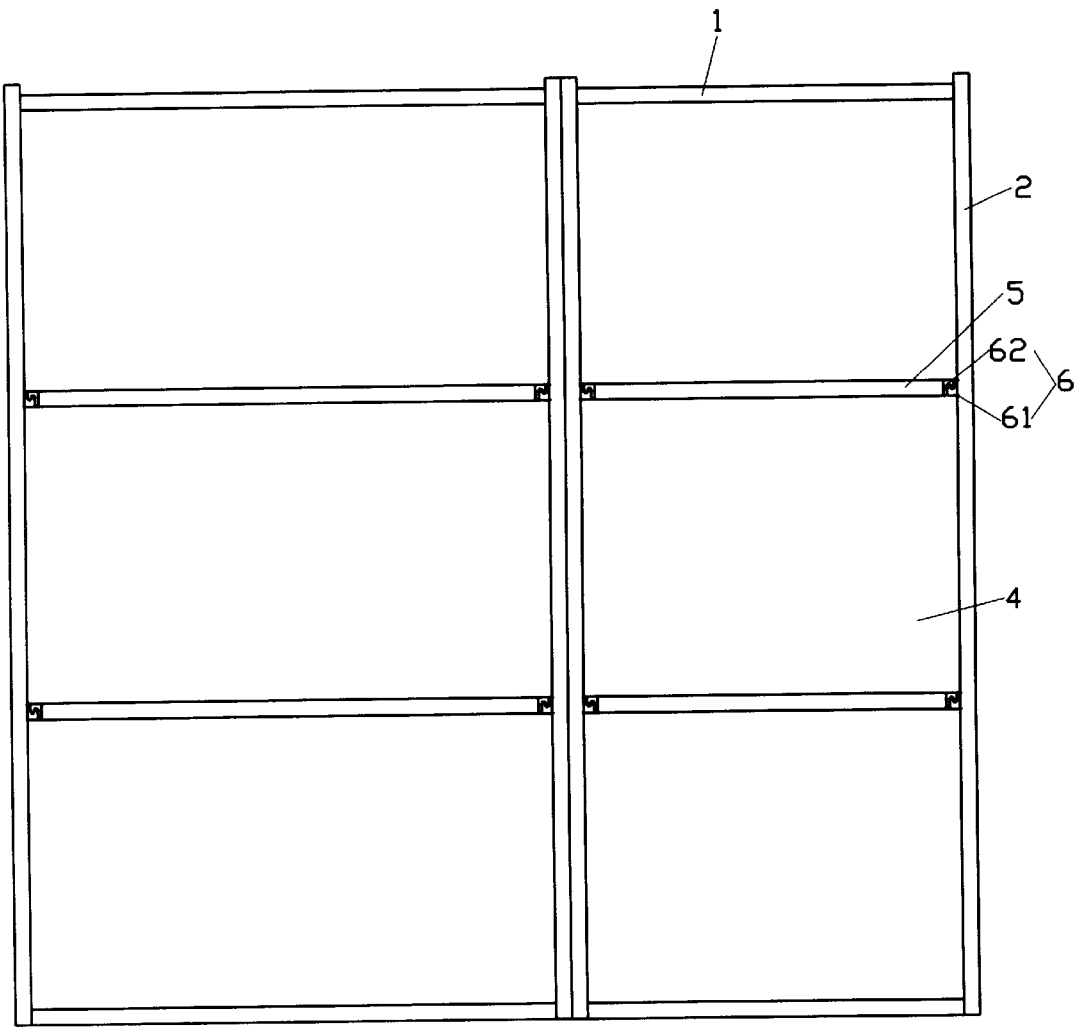
FIG. 4 demonstrates a variety of forms of a closet incorporating the present invention.

Furthermore, if the closet is to be placed in a smaller space, the top board 1, and deck boards 5 may be trimmed to fit into the limited space, as shown in FIG. 4.

Figure 5:
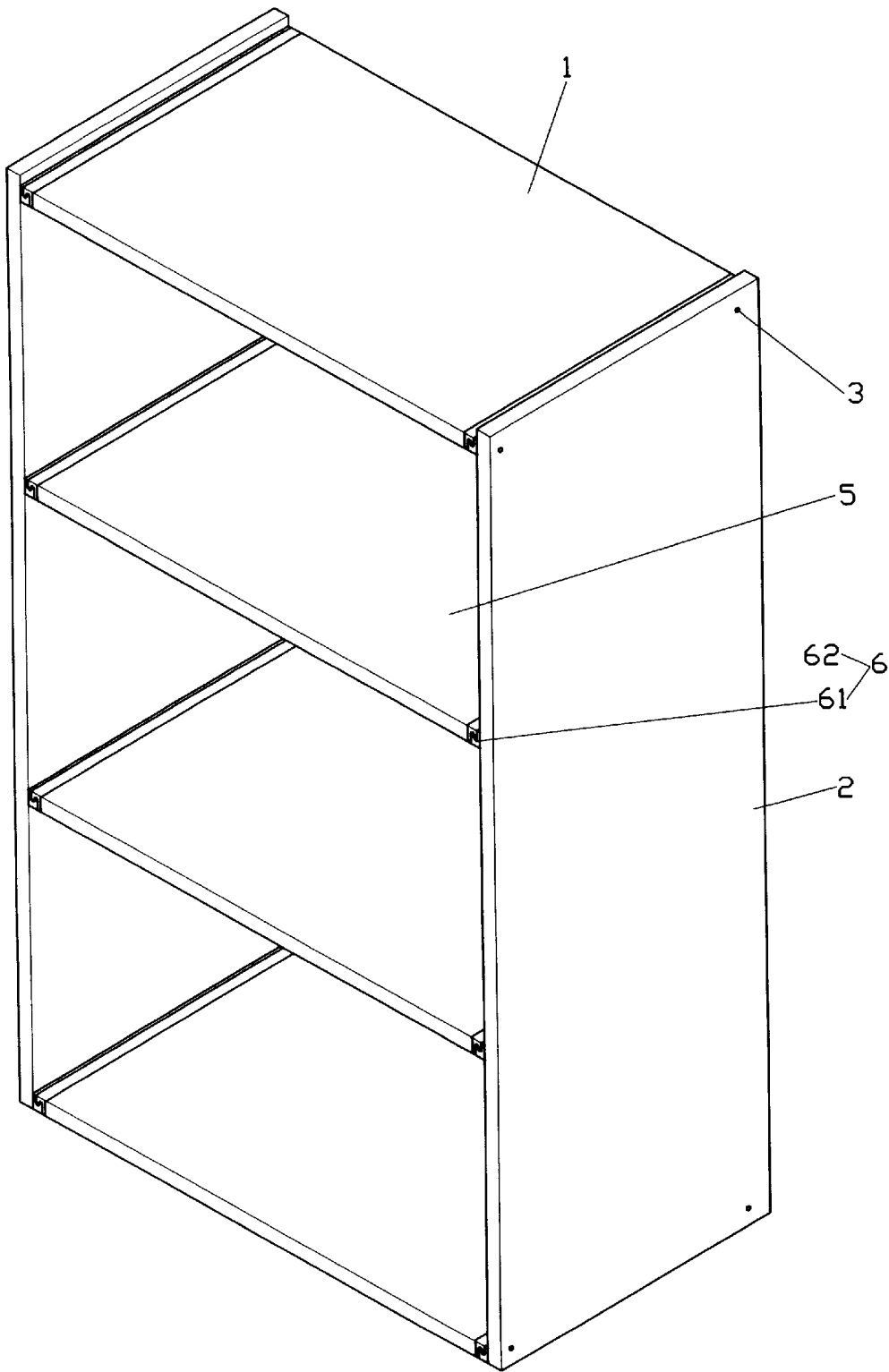
FIG. 5 demonstrates a further form of a closet incorporating the present invention.

The present invention may be also fastened with clip elements 6 on the top boards 1, as shown in FIG. 5.

Figure 6:
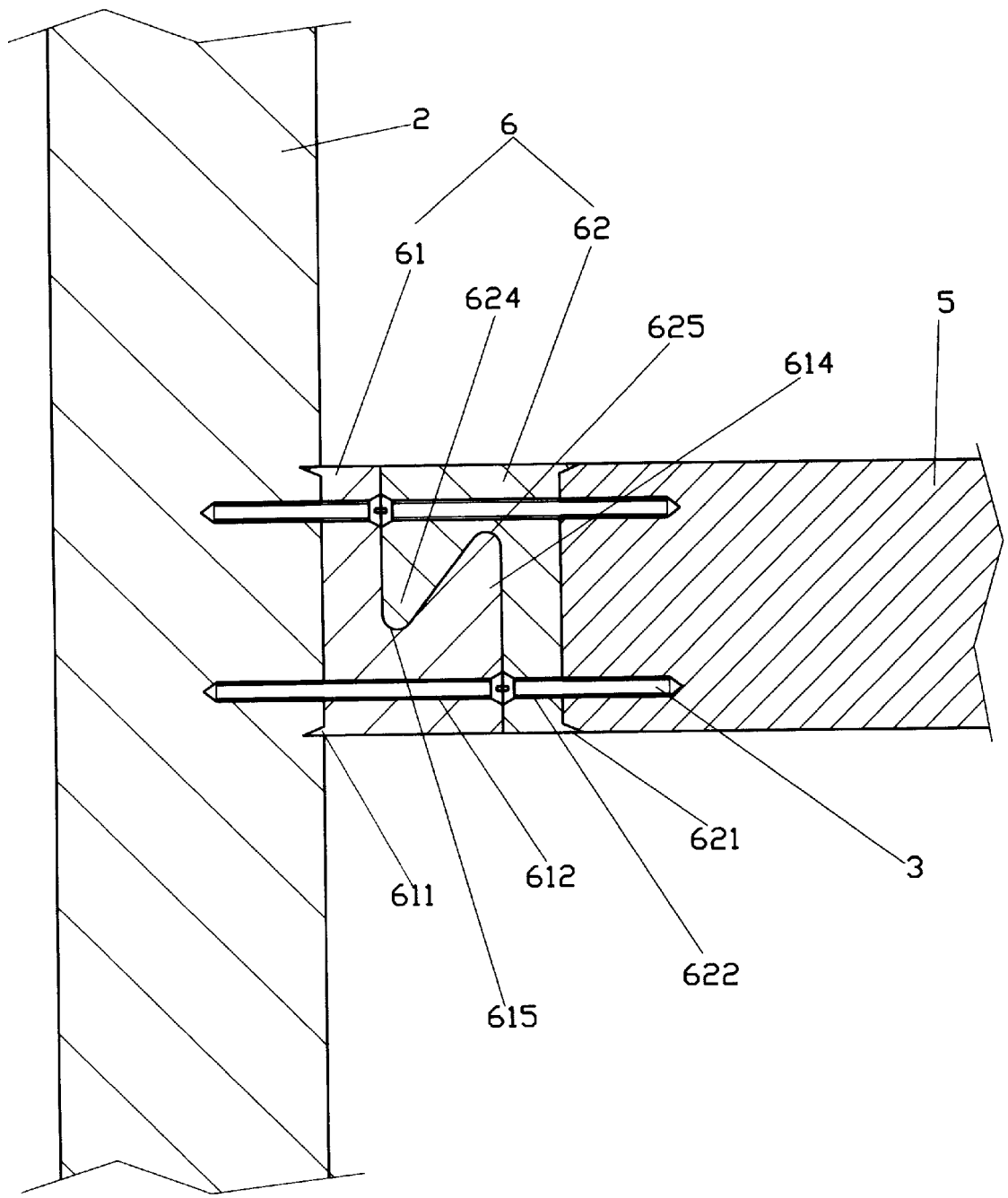
FIG. 6 is another embodiment of the present invention.
Figure 7:
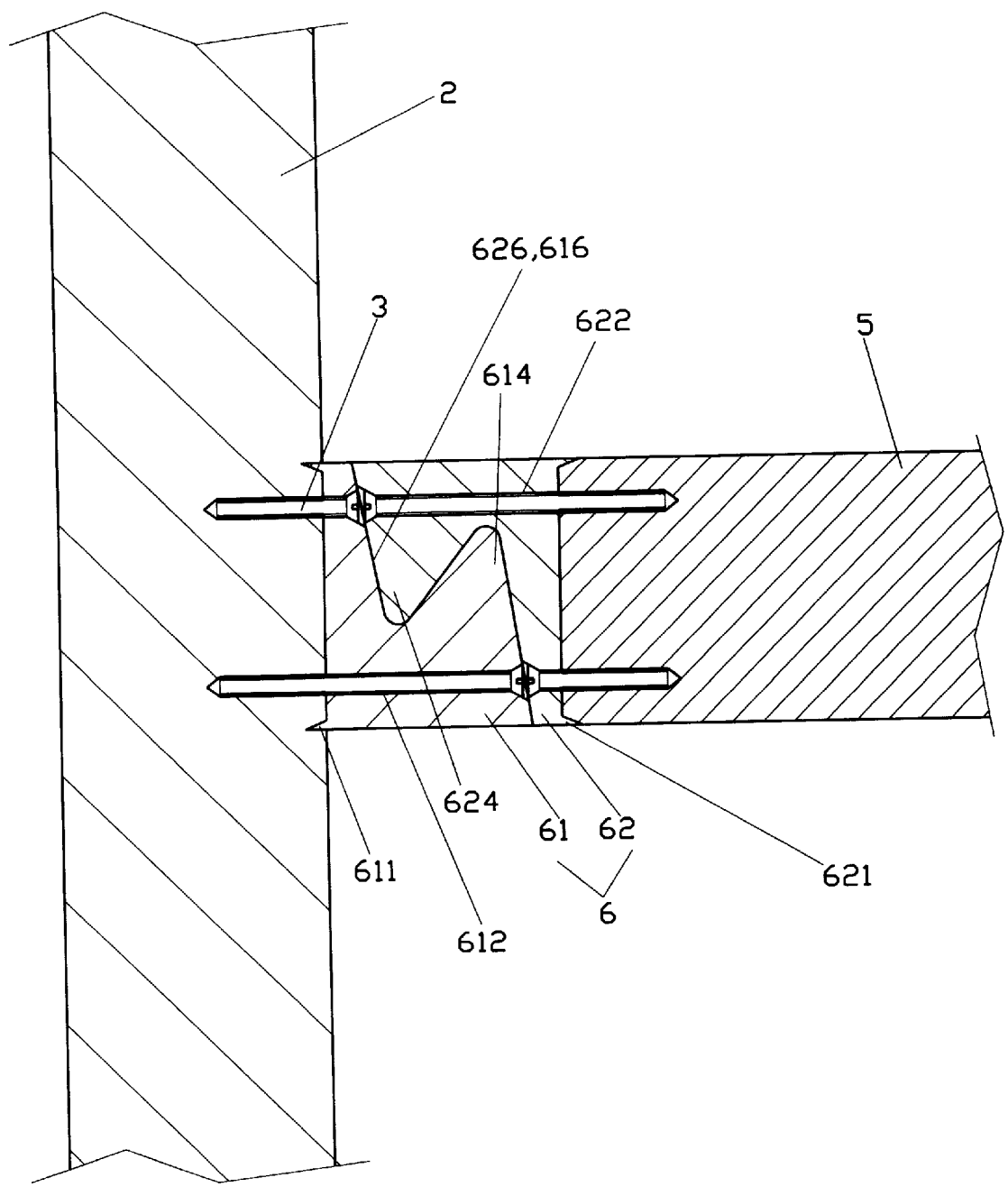
FIG. 7 is a third embodiment of the present invention.

Another embodiment of the present invention forms the protuberances 614 and 624 in a different shape, such as having a corn-shaped cross-section 615 and 625, as shown in FIG. 6, or protuberances 616 and 626 having an inclined corn-shaped cross-section with apertures 612 and 622 extending through the head of the protuberances 616 and 626, as shown in FIG. 7.

I claim:

1. A self-assembled closet comprising a top board, deck boards, and side boards, the improvements comprising each said deck board being secured on opposing ends thereof to corresponding inner portions of said side boards by respective clip elements, each said clip element comprising a male strip and a female strip respectively installed on one of said ends of said deck board and said side board, said male strip and said female strip each having (a) a plurality of through holes for coupling to a respective one of said deck boards and side boards, (b) a longitudinally extended protuberance, and (c) a longitudinally extended engaging recess corresponding to and engaged with said protuberance, said engaging recess of said clip element having a corn shaped cross-sectional contour, and said protuberance having a cross-sectional shape corresponding to said engaging recess.

2. The self-assembled closet as recited in claim 1, wherein said engaging recess has an inclined outer wall and said protuberance has an inclined wall corresponding to said inclined outer wall of said engaging recess.

* * * * *